United States Patent
Tamura et al.

(10) Patent No.: US 6,269,897 B1
(45) Date of Patent: Aug. 7, 2001

(54) STEERING CONTROL DEVICE

(75) Inventors: Kazuya Tamura; Sachio Kobayashi; Eishi Jitsukata, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/116,938

(22) Filed: Jul. 17, 1998

(30) Foreign Application Priority Data

Aug. 21, 1997 (JP) .................................................. 9-224750

(51) Int. Cl.⁷ ................................. B62D 6/00; B60Q 1/12
(52) U.S. Cl. ............................ 180/168; 340/439; 701/23
(58) Field of Search .................................... 180/167, 168; 318/564; 340/439; 701/23

(56) References Cited

U.S. PATENT DOCUMENTS

| | | | |
|---|---|---|---|
| 4,800,978 | * 1/1989 | Wasa et al. ........................... | 180/168 |
| 5,191,528 | * 3/1993 | Yardley et al. ...................... | 180/168 |
| 5,390,118 | * 2/1995 | Margolis et al. .................... | 180/168 |
| 5,815,825 | * 9/1998 | Tachibana et al. .................. | 701/23 |
| 5,929,785 | * 7/1999 | Satonaka ............................. | 340/903 |
| 5,931,250 | * 8/1999 | Kagawa et al. ..................... | 180/167 |
| 5,931,876 | * 8/1999 | Jung .................................... | 701/23 |
| 5,938,707 | * 8/1999 | Uehara ................................. | 701/41 |
| 5,957,983 | * 9/1999 | Tominaga ............................ | 701/23 |
| 6,005,492 | * 12/1999 | Tamura et al. ...................... | 340/937 |

* cited by examiner

Primary Examiner—Lanna Mai
Assistant Examiner—Jeffrey J. Restifo
(74) Attorney, Agent, or Firm—Arent Fox Kintner Plotkin & Kahn, PLLC

(57) ABSTRACT

A steering control device in which a level of a magnetic signal given by each magnetic nail buried in a road at intervals is detected by magnetism detecting means, an operation of a steering of a vehicle is controlled in accordance with the detected magnetic signal level, and an operation of the steering is controlled in accordance with a vehicle position and attitude angle of the vehicle detected by a vehicle position and attitude angle detecting means when any magnetic signal level is not detected by the magnetism detecting means.

1 Claim, 3 Drawing Sheets

STEERING CONTROL DEVICE

BACKGROUND OF THE INVENTION

1. Field of the Invention

The present invention relates to a steering control device for controlling a steering action of a vehicle making use of magnetic forces on the basis of a magnetic signal given by each magnetic nail buried in a road at intervals.

2. Description of the Related Background Art

Steering control devices are known (for example, in Laid-open Japanese Patent Publication No. 8-314541) which make use of a magnetic force generated from each magnetic nail buried in a road at intervals to control steering of a vehicle to enable automatic traveling. Such steering control devices normally detect a magnetic signal given by each magnetic nail, making use of a magnetic sensor provided on a vehicle, calculate an amount of steering control such that the magnetic signal is increased in level, and drive a steering actuator in accordance with the calculated amount of steering control.

Such conventional steering control devices, however, have problems in finding difficulty in precisely calculating an amount of steering control in accordance with a magnetic signal given by each magnetic nail in the case where a magnetic sensor itself does not work well due to malfunction or the like, magnetic nails are buried at non-uniform intervals, or a vehicle enters a road in which any magnetic nail is not buried, since the magnetic sensor detects a level of a magnetic signal given by each magnetic nail and an amount of steering control is calculated relying on only an output signal of the magnetic sensor.

SUMMARY OF THE INVENTION

It is an object of the invention to provide a steering control device capable of appropriately keeping a steering control even when a magnetic signal given by a magnetic nail cannot be detected.

A steering control device according to the invention comprises magnetism detecting means provided on a vehicle for detecting a level of a magnetic signal given by each magnetic nail buried in a road at intervals, steering control means for controlling an operation of a vehicle steering in accordance with the magnetic signal level detected by the magnetism detecting means, no-magnetism detecting means for generating a no-magnetism detecting signal when any magnetic signal level is not detected by the magnetism detecting means, and vehicle position and attitude angle detecting means for detecting a present vehicle position and attitude angle of the vehicle, and wherein the steering control means controls an operation of the vehicle steering in accordance with the vehicle position and attitude angle detected by the vehicle position and attitude angle detecting means in response to the no-magnetism detecting signal.

Accordingly, it is possible to maintain the steering control in accordance with the detected output of the vehicle position and attitude angle detecting means even when a magnetic signal given by a magnetic nail cannot be detected.

DETAILED DESCRIPTION OF THE PREFERRED EMBODIMENTS

An embodiment of the invention is described hereinbelow with reference to the accompanying drawings.

Figure 1:
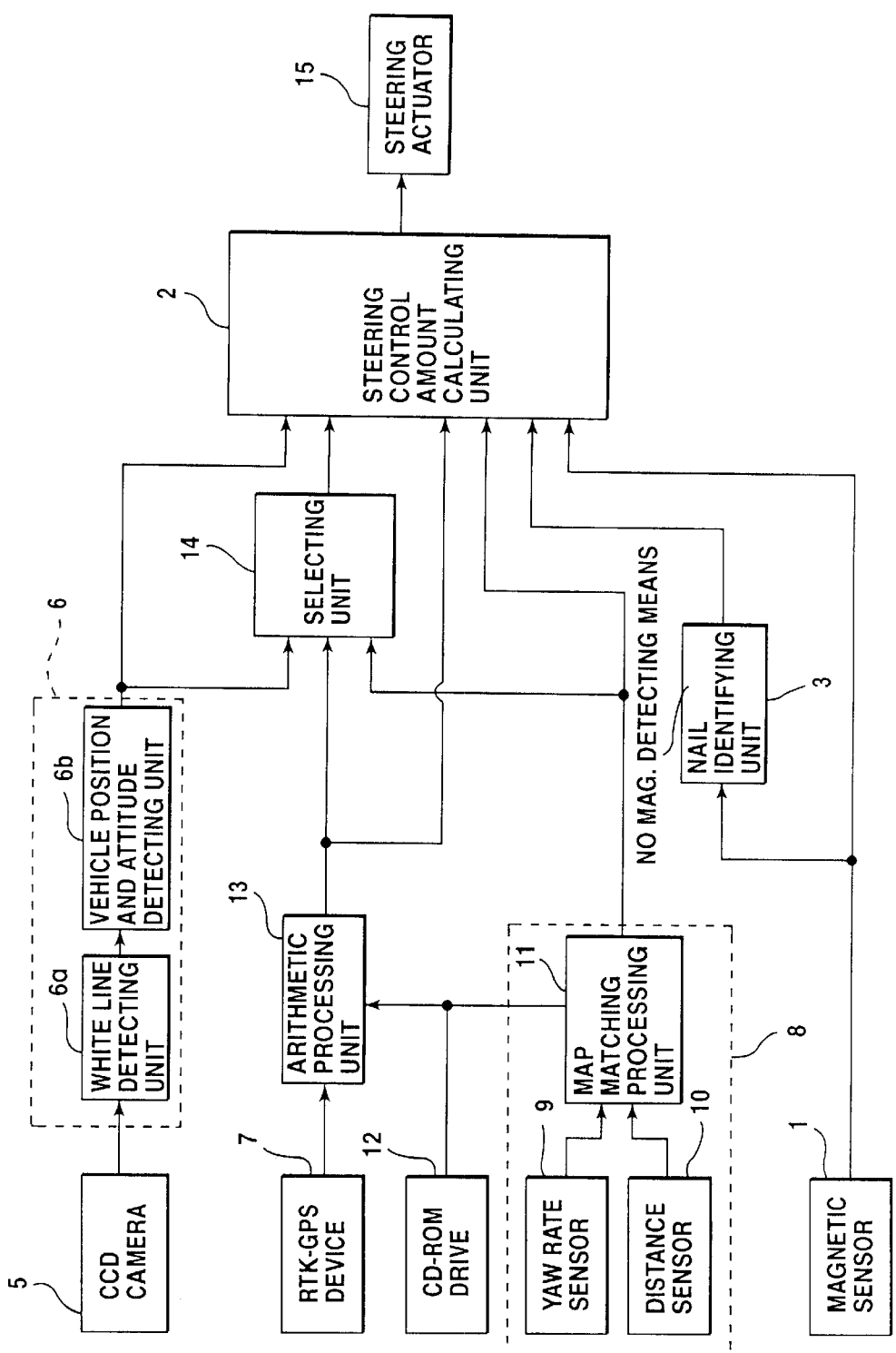
FIG. 1 is a block diagram showing an embodiment of the invention.

FIG. 1 shows a steering control device which is an embodiment of the invention. The steering control device is provided with a magnetic sensor 1 which constitutes magnetism detecting means for detecting a level of a magnetic signal given by each magnetic nail (not shown) buried in a road along a center line of a traffic lane at predetermined intervals. The magnetic sensor 1 is provided on a portion which faces the road, of vehicle (not shown), for detecting a level of a magnetic signal to generate a magnetism detecting signal corresponding to the detected level. Connected to the magnetic sensor 1 is a steering control amount calculating unit 2.

Further, connected to the magnetic sensor 1 is a nail identifying unit 3. The nail identifying unit 3 generates a no-magnetism detecting signal when the magnetic sensor 1 does not output any magnetism detecting signal over a predetermined period of time (for example, 0.3 second) or longer. The no-magnetism detecting signal is fed to the steering control amount calculating unit 2 which constitutes steering control means. The nail identifying unit 3 corresponds to no-magnetism detecting means.

Also, in the steering control device, a CCD (Charge Coupled Device) camera 5, which constitutes photographing means, is provided on a front portion of the vehicle to enable photographing the road surface in front of the vehicle. An image signal obtained by the CCD camera 5 is fed to an image processing unit 6. The image processing unit 6 detects a traffic lane on the basis of an image signal from the CCD camera 5 to identify a vehicle position on the traffic lane and to detect a vehicle attitude angle (an angle between a direction of the traffic lane and a direction of the vehicle) relative to the traffic lane.

An RTK-GPS (Real time Kinematic-Global Positioning System) device 7 receives radio waves sent from a plurality of artificial satellites by means of a plurality of antenna on the vehicle to detect an absolute position of the vehicle in accordance with latitude and longitude information obtained from the received radio waves. An inertial navigation system 8 comprises a yaw rate sensor 9, a distance sensor 10 and a map matching processing unit 11.

The yaw rate sensor 9 detects an angular velocity of the vehicle, and the distance sensor 10 detects a travel distance of the vehicle. The map matching processing unit 11 detects a travel locus in accordance with a direction, which is obtained by integrating and adding of vehicle angular velocities detected by the yaw rate sensor 9 and a travel distance of the vehicle detected by the distance sensor 10. Further, the map matching processing unit 11 calculates a vehicle position and an attitude angle of the vehicle by using map data obtained from a CD-ROM drive 12 on the basis of the detected travel locus. When the map matching provides a vehicle position on a road, an inclination of the road at the vehicle position is known from the map data, and an angle at which the front of the vehicle looks on the road is calculated as an attitude angle in accordance with a difference between an output of the yaw rate sensor 9 and the inclination of the road at the vehicle position. The CD-ROM drive 12 drives a CD-ROM (not shown), on which the above map data are recorded, to read the recorded map data.

On the other hand, the RTK-GPS device 7 is provided with an arithmetic processing unit 13 which uses a plurality of three dimensional coordinate positional data and the map data outputted from the CD-ROM drive 12 to calculate a vehicle position and an attitude angle of the vehicle. The arithmetic processing unit 13 supplies the vehicle position and attitude angle of the vehicle to a selecting unit 14.

The CCD camera 5 and the image processing unit 6, the RTK-GPS device 7 and the arithmetic processing unit 13, and the inertial navigation system 8, respectively, correspond to the vehicle position and attitude angle detecting means.

Connected to the selecting unit 14 are outputs of the image processing unit 6 and of the map matching processing unit 11 as well as an output of the arithmetic processing unit 13. The selecting unit 14 receives vehicle positions successively supplied from the image processing unit 6, the map matching processing unit 11 and the arithmetic processing unit 13, respectively, detects the travel locus so far on the basis of these vehicle positions, predicts a subsequent vehicle position, and compares the predicted vehicle position with an actual vehicle position at this time. If the actual vehicle position data at this time is within an allowable range in which the predicted vehicle position is contained, the selecting unit 14 judges that the actual vehicle position data has continuity. The judgement is given individually by the image processing unit 6, map matching processing unit 11 and the arithmetic processing unit 13. Further, the selecting unit 14 generates a data selecting command signal indicative of which output data of the image processing unit 6, the map matching processing unit 11 and the arithmetic processing unit 13 should be employed, on the basis of the judgement result of data continuity.

An output of the selecting unit 14 is connected to the steering control amount calculating unit 2. The steering control amount calculating unit 2 calculates a steering control amount consisting of a steering amount and a steering velocity in accordance with an output of the magnetic sensor 1 when any no-magnetism detecting signal is not supplied from the nail identifying unit 3. On the other hand, when a no-magnetism detecting signal is supplied from the nail identifying unit 3, an amount of steering control is calculated in accordance with a vehicle position and attitude angle of the vehicle which are output data from one of the image processing unit 6, the map matching processing unit 11 and the arithmetic processing unit 13. The one is indicated by a data selecting command signal output from the selecting unit 14. The steering control amount calculating unit 2 drives a steering actuator 15 in accordance with the calculated amount of steering control. The steering actuator 15 gives a mechanical torque to a steering (not shown) of the vehicle.

The above-described steering control amount calculating unit 2, nail identifying unit 3, image processing unit 6, map matching processing unit 11, arithmetic processing unit 13 and selecting unit 14 are constituted by a single microcomputer or a plurality of microcomputers to operate in synchronism with a clock signal from a clock generator (not shown).

In the steering control device, the magnetic sensor 1 detects a level of a magnetic signal given by each of the magnetic nails buried in a road, and magnetism detecting signals indicative of the levels are fed to the steering control amount calculating unit 2. The steering control amount calculating unit 2 calculates a target amount of steering so as to maximize a level of the magnetism detecting signal, and calculates an amount of steering control so as to make a present actual amount of steering which is detected by a steering angle sensor (not shown), equal to the target amount of steering to drive the steering actuator 15 in accordance with the amount of steering control.

An image signal issued by the CCD camera 5 to indicate a road image is fed to the image processing unit 6. In a white line detecting unit 6a of the image processing unit 6, a threshold is first set for a white line in the road image, and the white line is defined by a position of a pixel where a brightness level exceeds the threshold on respective horizontal lines of the road image photographed. The threshold of the white line may be predetermined or may be an average value of brightness levels of the respective pixels on the same horizontal line of an image formed by the image signal.

In a vehicle position and attitude detecting unit 6b of the image processing unit 6, when a traffic lane located between white lines identified by the white line detecting unit 6a is detected, a vehicle position on the traffic lane is identified and an attitude angle of the vehicle in relation to the traffic lane is detected. The vehicle position and attitude angle are fed to the selecting unit 14.

In the map matching processing unit 11, a vehicle position and an attitude angle on a straight road are obtained by a known method on the basis of respective sensor outputs of the yaw rate sensor 9 and the distance sensor 10.

Figure 2:
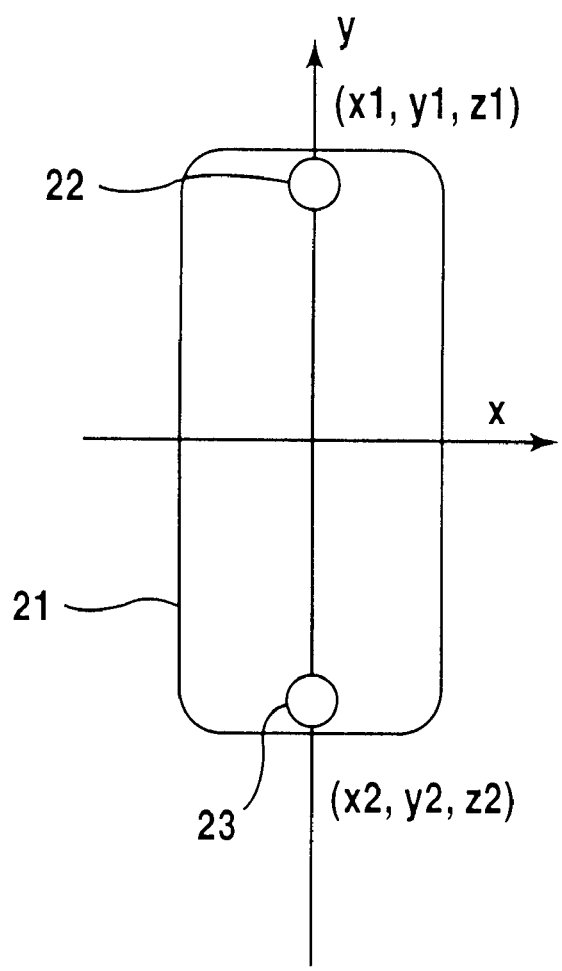
FIG. 2 is a view showing a position at which an antenna of an RTK-GPS device is mounted.

The arithmetic processing unit 13 is supplied with three dimensional coordinate data which indicates mount positions for respective antennas on the vehicle, from the RTK-GPS device 7. Here, as shown in FIG. 2, it is assumed that a moving direction of the vehicle 21 defines a y axis, a direction perpendicular to the y axis in a horizontal plane defines a x axis, and antennas 22, 23 are mounted in the front of and in the rear of the vehicle on the y axis. An axis perpendicular to the x and y axes defines a z axis (not shown). In the RTK-GPS device 7, three dimensional coordinate data obtained by the antenna 22 constitute x1, y1 and z1, and three dimensional coordinate data obtained by the antenna 23 consists of x2, y2 and z2. A position (Xv, Yv, Zv) of the vehicle is calculated from the following equation.

$$(Xv, Yv, Zv) = ((x1+x2)/2, (y1+y2)/2, (z1+z2)/2)$$

Also, an attitude angle θ1 of the vehicle in the moving direction of the vehicle is calculated from the following equation.

$$\theta 1 = ATAN ((y2-y1)/(x2-x1))$$

where ATAN means an arc tangent.

Actually, a pitching angle in a YZ direction and a roll angle in a ZX direction are calculated as attitude angles of the vehicle in a similar manner to the attitude angle of the vehicle in the moving direction of the vehicle.

Fed to the selecting unit 14 are vehicle positions and attitude angles of the vehicle calculated in the map matching processing unit 11 and the arithmetic processing unit 13, respectively.

The selecting unit 14 holds the vehicle positions and attitude angles supplied individually from the image processing unit 6, the map matching processing unit 11 and the arithmetic processing unit 13, and predicts a subsequent vehicle position on the basis of a travel locus found from the vehicle positions for each of the image processing unit 6, the map matching processing unit 11 and the arithmetic processing unit 13 to compare the predicted vehicle position with the actual vehicle position at the present time. If the actual vehicle position at the present time is within an allowable range in which the predicted vehicle position is contained, the selecting unit 14 judges that the actual vehicle positional data at the present time has continuity.

Since the image processing unit 6, the map matching processing unit 11 and the arithmetic processing unit 13 are ranked by the priority order of the arithmetic processing unit 13, the map matching processing unit 11 and the image processing unit 6, a data selecting command signal indicative of a GPS is generated by the arithmetic processing unit 13 when output data of the arithmetic processing unit 13 is continuous. When output data of the arithmetic processing unit 13 is not continuous and output data of the map matching processing unit 11 is continuous, a data selecting command signal indicative of inertial navigation is generated from the map matching processing unit 11. When respective output data of the arithmetic processing unit 13 and the map matching processing unit 11 are continuous and output data of the image processing unit 6 is continuous, a data selecting command signal indicative of a camera image is generated from the image processing unit 6.

A vehicle position and an attitude angle of the vehicle which are an arithmetic output from the arithmetic processing unit 13, are obtained, for example, every 0.1 second, and their data cannot be calculated during traveling in a tunnel. A frequency at which their data are obtained from the arithmetic processing unit 13 per unit time, is small as compared with a vehicle position and an attitude angle of the vehicle, which are obtained from the map matching processing unit 11. Only when the arithmetic processing unit 13 calculates and outputs a vehicle position and an attitude angle of the vehicle, the selecting unit 14 uses such data. The selecting unit 14 uses a vehicle position and an attitude angle of the vehicle obtained from the map matching processing unit 11 in cases except that.

For example, when the vehicle enters a road in which any magnetic nail is not buried, the magnetic sensor 1 cannot detect any magnetic signal and so cannot generate any magnetism detecting signal. The nail identifying unit 3 generates a no-magnetism detecting signal when the magnetic sensor 1 does not output any magnetism detecting signal over a predetermined period of time.

Figure 3:
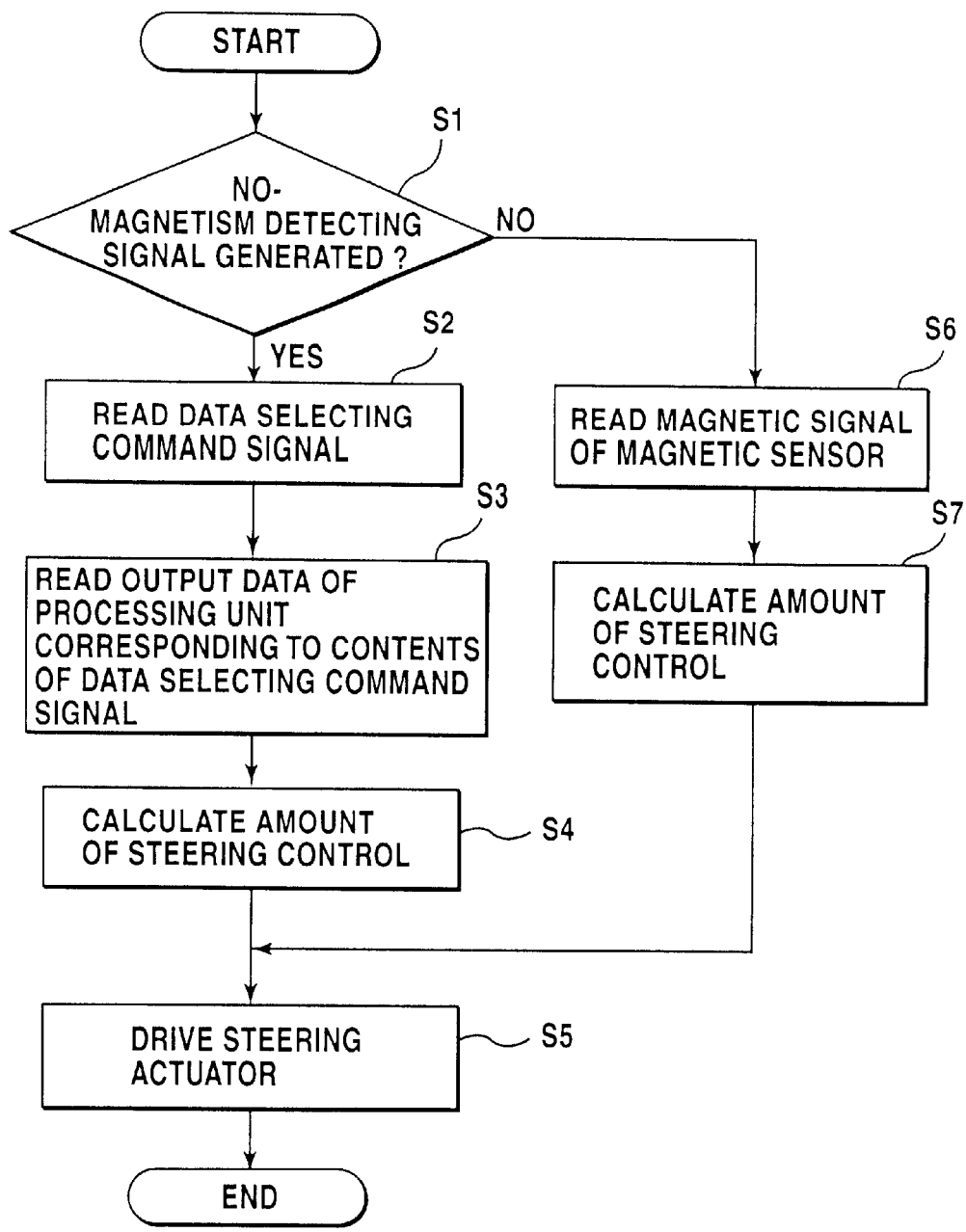
FIG. 3 is a flowchart showing an action of a steering control amount calculating unit.

As shown in FIG. 3, the steering control amount calculating unit 2 judges whether a no-magnetism detecting signal is generated (step S1). When a no-magnetism detecting signal is supplied from the nail identifying unit 3, the steering control amount calculating unit 2 reads a data selecting command signal from the selecting unit 14 (step S2), reads a vehicle position and an attitude angle of the vehicle which are output data from either one of the image processing unit 6, the map matching processing unit 11 and the arithmetic processing unit 13, and are indicated by the data selecting command signal from the selecting unit 14 (step S3). The steering control amount calculating unit 2 calculates a target amount of steering at the vehicle position in accordance with the read data and calculates an amount of steering control so as to make an actual amount of steering which is detected by the steering angle sensor, equal to the target amount of steering (step S4), and the steering control amount calculating unit 2 drives the steering actuator 15 in accordance with the amount of steering control (step S5). Driving the steering actuator 15 enables traveling with front wheels oriented in the traffic lane.

The steering control amount calculating unit 2 reads the magnetism detecting signal issued from the magnetic sensor 1 in the case where any no-magnetism detecting signal is not generated by the nail identifying unit 3 (step S6), calculates an amount of steering control in accordance with the read level (step S7), as described above and proceeds to Step S5 to drive the steering actuator 15.

In the above embodiment, the nail identifying unit 3 generates a no-magnetism detecting signal when the magnetic sensor 1 does not output any magnetism detecting signal over a predetermined period of time, in order to prevent a no-magnetism detecting signal from being generated to permit a control amount calculating method in the steering control amount calculating unit 2 to be changed even when a magnetic signal is not momentarily generated from the magnetic sensor 1.

Further, instead of the above predetermined period of time, the nail identifying unit 3 may generate a no-magnetism detecting signal in the case where a magnetism detecting signal is not issued from the magnetic sensor 1 when the vehicle has travelled over a predetermined distance (for example, 5 meters).

In the above embodiment, while the CCD camera 5 and the image processing unit 6, the RTK-GPS device 7 and the arithmetic processing unit 13, and the inertial navigation system 8, respectively, are employed as a means for detecting a present vehicle position and an attitude angle of the vehicle, one of the above elements may be employed as such means. Further, other means for detecting a present vehicle position and an attitude angle of the vehicle may be employed.

Further, the above embodiment arranges the order of priority for selecting data in the selection unit 14 in the order of the arithmetic processing unit 13, the map matching processing unit 11 and the image processing unit 6, but such order of priority is not limited to the above one.

As described above, according to the invention, an operation of a vehicle steering is controlled in accordance with a magnetism detecting signal issued from the magnetism detecting means which detects a level of a magnetic signal given by each magnetic nail buried in a road at intervals, and an operation of steering is controlled in accordance with a vehicle position and an attitude angle of the vehicle detected by the vehicle position and attitude angle detecting means when any magnetic signal level is not detected by the magnetism detecting means, so that it is possible to maintain a steering control in accordance with a detected output of the vehicle position and attitude angle detecting means even when any magnetic signal given by each magnetic nail cannot be detected. Accordingly, the invention is very effective in the case where a magnetic sensor itself does not work well due to malfunction or the like, magnetic nails are buried at non-uniform intervals, or a vehicle enters a road where no magnetic nail is buried.

What is claimed is:

1. A steering control device comprising:
   magnetism detecting means provided on a vehicle for detecting a level of a magnetic signal given by magnetic nails buried in a road at intervals;
   steering control means for controlling an operation of a steering of said vehicle in accordance with the magnetic signal level detected by said magnetism detecting means;
   no-magnetism detecting means for generating a no-magnetism detecting signal when any magnetic signal level is not detected by said magnetism detecting means;
   a plurality of vehicle position and attitude angle detectors for detecting a present vehicle position and an attitude angle of said vehicle by using respective detecting methods which differ from each other; and
   selecting means for selecting one present vehicle position value and attitude angle value of present vehicle position values and attitude angle values of said vehicle detected respectively by said plurality of vehicle position and attitude angle detectors, on the basis of the detected present vehicle position values and attitude angle values, and outputting the one present vehicle position value and attitude angle value;
   wherein said steering control means controls an operation of said steering in accordance with the one vehicle position value and attitude angle value selected by said selecting means in response to the no-magnetism detecting signal.

* * * * *